United States Patent
Kim et al.

(10) Patent No.: US 8,412,135 B2
(45) Date of Patent: Apr. 2, 2013

(54) APPARATUS AND METHOD FOR CONTROLLING POWER OF TRANSMITTER IN A MESH NETWORK

(75) Inventors: Jae-Hoon Kim, Seoul (KR); Young-Gon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1168 days.

(21) Appl. No.: 11/878,213

(22) Filed: Jul. 23, 2007

(65) Prior Publication Data

US 2008/0026711 A1 Jan. 31, 2008

(30) Foreign Application Priority Data

Jul. 25, 2006 (KR) .................. 10-2006-0069834

(51) Int. Cl.
*H01Q 11/12* (2006.01)
*H04B 1/04* (2006.01)

(52) U.S. Cl. ................ 455/127.1; 455/115.3; 455/127.5

(58) Field of Classification Search .... 455/115.1–115.3, 455/127.1–127.5
See application file for complete search history.

(56) References Cited

U.S. PATENT DOCUMENTS

| 5,490,287 A | * | 2/1996 | Itoh et al. | 455/41.3 |
| 5,812,025 A | * | 9/1998 | Shimazaki | 330/129 |
| 6,801,759 B1 | * | 10/2004 | Saifuddin | 455/127.1 |

FOREIGN PATENT DOCUMENTS

| KR | 10-2003-0056308 A | 7/2003 |
| KR | 10-2005-0072510 A | 7/2005 |
| WO | WO 2004/079919 A2 | 9/2004 |

* cited by examiner

*Primary Examiner* — Christian Hannon
(74) *Attorney, Agent, or Firm* — NSIP Law

(57) ABSTRACT

A method and apparatus for controlling power of a transmitter in a mesh network. A controller, if it sets a reference power to one of a first measured transmission power and a maximum power, compares the reference power with a first power in level, and compares the first power with a second power in level. A cumulation factor calculator calculates a cumulation factor by comparing the first power with the second power. A reference power setter sets the reference power according to a scope to which a value obtained by adding a reference power to a sum of the calculated cumulation factors belongs. A power controller controls transmission power according to the set reference power.

25 Claims, 5 Drawing Sheets

APPARATUS AND METHOD FOR CONTROLLING POWER OF TRANSMITTER IN A MESH NETWORK

PRIORITY

This application claims the benefit under 35 U.S.C. § 119 (a) of a Korean Patent Application filed in the Korean Intellectual Property Office on Jul. 25, 2006 and assigned Serial No. 2006-69834, the disclosure of which is incorporated herein by reference.

BACKGROUND OF THE INVENTION

1. Field of the Invention

The following description relates generally to an apparatus and method for controlling power of a transmitter in a mesh network, and in particular, to a power control apparatus and method for simultaneously enabling correct tracking and power control of a transmitter by tracking mobility with a cumulated change while performing power control in a mesh network.

2. Description of the Related Art

Generally, networks have a point-to-point or point-to-multipoint star topology. Recently, however, there is a growing interest in the wireless network having a multipoint-to-multipoint mesh structure like the wire network.

The mesh network can reduce power consumption by controlling transmission power at a transmitter. The transmitter includes a Mesh Access Point (MAP), a Mesh Point (MP) or a Station (STA). The reduction in the power consumption increases a life time of the mesh network system. Therefore, in the mesh network, the power control is an important issue.

In the mesh network, neighboring nodes can receive signals between a transmitter and a receiver. When high-power signals are exchanged between the transmitter and the receiver, the neighboring nodes may receive interference from the signals. An increase in the power of the signals increases not only the number of neighboring nodes receiving interference, but also a level of the interference to the neighboring nodes. Therefore, the power control is an important issue even in terms of interference cancellation.

The power control can obtain the foregoing gains, but may cause a problem in mobility measurement between two nodes for the following reason. That is, the mobility measurement between two nodes is made depending on signal strength, and the signal strength varies by the power control. Therefore, the power-controlled, signal may cause distorted information in distance measurement between two nodes.

However, the conventional technology, as it cannot simultaneously perform power control and mobility measurement, may cause considerable distortion in mobility measurement information during power control. In the mesh network, the distorted information may increase an inter-signal delay and damage packets, making it impossible to provide seamless services.

SUMMARY OF THE INVENTION

An aspect of examples described herein is to provide an apparatus and method for controlling transmission power of a transmitter to reduce energy consumption and interference.

Another aspect is to provide a power control apparatus and method for simultaneously performing mobility tracking and power control to reduce an inter-signal delay and provide seamless services.

Another aspect is to provide a power control apparatus and method for enabling correct tracking of a node by performing mobility tracking with a cumulated change during power control, and for generating routing information based on the tracking information.

In one general aspect, there is provided a method for controlling power of a transmitter in a mesh network. The power control method includes calculating a cumulation factor by comparing a first power with a second power; and controlling transmission power according to a scope to which a value obtained by adding a predetermined reference power to a sum of the calculated cumulation factors.

In another aspect, there is provided an apparatus for controlling power of a transmitter in a mesh network. The power control apparatus includes a controller for, if it sets a reference power to one of a first measured transmission power and a maximum power, comparing the reference power with a first power, and comparing the first power with a second power; a cumulation factor calculator for calculating a cumulation factor by comparing the first power with the second power; a reference power setter for setting the reference power according to a scope to which a value obtained by adding a reference power to a sum of the calculated cumulation factors; and a power controller for controlling transmission power according to the set reference power.

BRIEF DESCRIPTION OF THE DRAWINGS

The above and other aspects and features will become more apparent from the following detailed description when taken in conjunction with the accompanying drawings in which.

DETAILED DESCRIPTION

Figure 1:
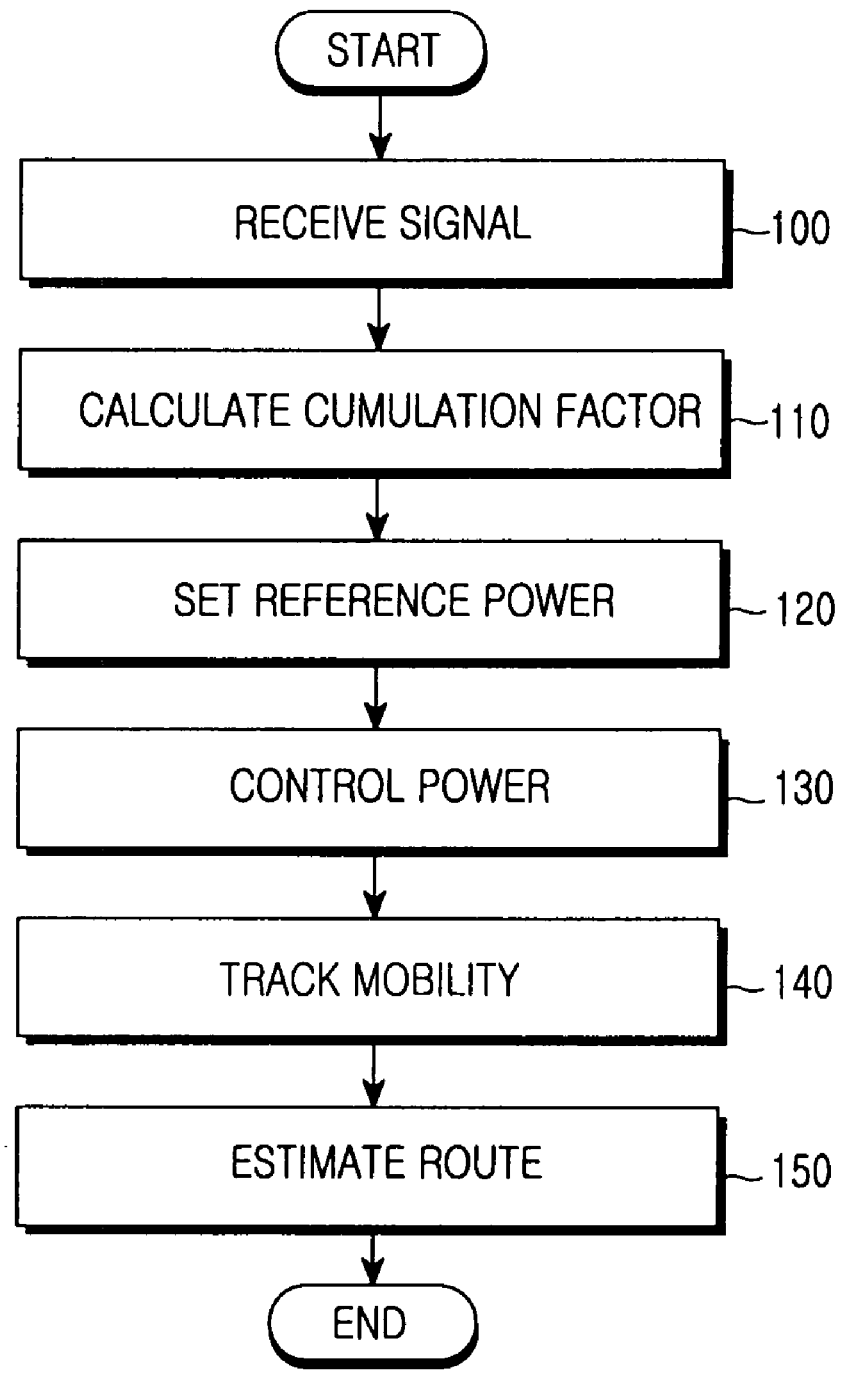
FIG. 1 is a flowchart illustrating an example of a power control method for simultaneously performing power control and mobility tracking of a transmitter.

General aspects of examples described herein will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

A description will now be made of an example of an algorithm capable of simultaneously performing power control and mobility tracking of a transmitter.

A transmission power value is subdivided into a maximum power P_max, control power P_control, and reference power P_Reference. The 'control power' refers to the power that the transmitter has measured for power control. Based on the subdivided factors, power consumed by the transmitter is reduced, and mobility detection routing is provided. Herein, the maximum power indicates the maximum transmission power currently used by the transmitter, the control power indicates measured transmission power for power control, and the reference power indicates a reference for mobility tracking of the transmitter.

The reference power P_Reference can be set as maximum power P_max, first control power P_control__1, and lowered first control power P_control_low_1 according to a scope to which reference power plus a sum of all cumulation factors belongs. The first control power indicates the first measured power value.

A description of an algorithm will now be made for the case where the reference power P_Reference is greater than the currently measured power value, or current control power P_control_i. The algorithm is shown in Table 1.

TABLE 1

// directivity of transmitter //
    P_Reference = P_control_1 // The transmitter is adjusted to the first
measured power as a distance from a neighboring transmitter becomes shorter. //;
    If (P_Reference > P_control_i) && (P_control_i−1 > P_control_i)
    P_cumulation_i = P_control_i − P_control_i−1 ........... Equation (1); //
A distance between two transmitters becomes longer. That is, signal strength
decreases. //
    Otherwise(P_Reference>P_control_i)&&(P_control_i−1< P_control_i)
    P_cumulation_i = P_control_i − P_control_i−1 ............ Equation (2); //
A distance between two transmitters becomes shorter. That is, signal strength
increases. //
// power control and mobility estimation //
    If P_close_range_region ⊃ P_Reference + Σ P_cumulation_i
    Do Power control : Decrease P_control;
    // The transmitter controls power as the distance becomes shorter. //
    P_Reference = P_control_close_new;
    If P_Reference_region ⊃ P_Reference + Σ P_cumulation_i
    Do power control : Keep P_control or Adjust P_control;
            Keep P_Reference;

The directivity of the transmitter will first be described below.

The transmitter sets the reference power P_Reference to the first measured power value that is, the first control power P_control_1. If the reference power P_Reference is greater than the currently measured power value that is, current control power P_control_i, and the previously measured that is, previous control power P_control_i−1, is greater than the current control power P_control_i, the transmitter sets a current cumulation factor P_cumulation_i using Equation (1). The current cumulation factor P_cumulation_i is a value obtained by subtracting the previous control power P_control_i−1 from the current control power P_control_i. If the current cumulation factor is a negative number, it indicates a decrease in the signal strength. That is, in this case, the distance between two transmitters becomes longer.

On the contrary, if the reference power P_Reference is greater than the current control power P_control_i and the previous control power P_control_i−1 is less than the current control power P_control_i, the transmitter sets the current cumulation factor P_cumulation_i using Equation (2). The current cumulation factor P_cumulation_i is a value obtained by subtracting the previous control power P_control_i−1 from the current control power P_control_i. If the current cumulation factor is a positive number, it indicates an increase in the signal strength. That is, in this case, the distance between two transmitters becomes shorter.

The two cases are in common in that the reference power is greater than the current control power. That is, the algorithm of Table 1 is applied when a relative distance between two transmitters at the time that the power is currently controlled, is longer than a relative distance at the time that the power was first controlled.

A description will now be made of power control and mobility estimation.

The transmitter determines to which region a sum of all cumulation factors belongs, using the reference power and Equations (1) and (2). If the reference power plus the sum of all cumulation factors is in a close range boundary region P_close_range_region, the transmitter decreases the control power and changes the reference power to a low control power P_control_close_new. Herein, the close range boundary region P_close_range_region can be set close to the close range boundary P_control_close_threshold to indicate the decrease in the reference power value. In addition, if the reference power plus the sum of cumulation factors is in a reference power region P_Reference_region, the transmitter can adjust the power, or keep the power. In adjusting the power, if the sum of cumulation factors increases, the transmitter decreases the control power in a possible scope by controlling the power, and if the sum of cumulation factors decreases, the transmitter increases the control power to a possible value by controlling the power. In keeping the power, the transmitter keeps the power as a cumulated change is not great.

A description of an algorithm will now be made for the case where the reference power is less than the currently measured power value, or current control power P_control_i. The algorithm is shown in Table 2.

TABLE 2

// directivity of transmitter //
    P_Reference = P_max; // P_control_1 is the currently measured value
rather than controlled power, and a distance between transmitters becomes longer.
//
    If (P_Reference < P_control_i) && (P_control_i−1 < P_control_i)
    P_cumulation_i = P_control_i − P_control_i−1 .......... Equation (3) // A
distance between two transmitters becomes shorter. That is, relative signal
strength increases. //
    Otherwise (P_Reference < P_control_i) && (P_control_i−1 >P_control_i)
    P_cumulation_i = P_control_i − P_control_i−1 ............ Equation (4) // A
distance between two transmitters becomes longer. That is, relative signal TABLE 2-continued

```
strength decreases. //
    // power control and mobility estimation //
    If P_Reference_region ⊃ P_Reference + Σ P_cumulation_i
    Do power control : Keep P_control or Adjust P_control;
            Keep P_Reference;
    If P_max_region ⊃ P_Reference + Σ P_cumulation_i
    Do power control : Keep P_control or Adjust P_control;
            Keep P_Reference;
    If P_long_range_region ⊃ P_Reference + Σ P_cumulation_i
    Do Mobility routing protocol trigger;
    Do Power control : Increase P_max with P_control_long_new
                                                        (if
possible);
        P_Reference = P_max;
```

The directivity of the transmitter will first be described below.

The transmitter sets the reference power P_Reference to the maximum power P_max. If the reference power P_Reference is less than the currently measured power value, or current control power P_control_i, and the previously measured power value, or previous control power P_control_i−1, is less than the current control power P_control_i, the transmitter sets the cumulation factor P_cumulation_i using Equation (3). The current cumulation factor P_cumulation_i is a value obtained by subtracting the previous control power P_control_i−1 from the current control power P_control_i. If the current cumulation factor is a positive number, it indicates an increase in the signal strength. That is, in this case, the distance between two transmitters becomes shorter.

On the contrary, if the reference power is less than the current control power and the previous control power is greater than the current control power, the transmitter sets the current cumulation factor P_cumulation_i using Equation (4). The current cumulation factor P_cumulation_i is a value obtained by subtracting the previous control power P_control_i−1 from the current control power P_control_i. If the current cumulation factor is a negative number, it indicates a decrease in the signal strength. That is, in this case, the distance between two transmitters becomes longer.

The two cases are in common in that the reference power P_Reference is less than the current control power P_control_i. That is, the algorithm of Table 2 is applied when a relative distance between two transmitters at the time that the power is currently controlled, is shorter than a relative distance at the time that the power was first controlled.

When the reference power plus the sum of cumulation factors is in the reference power region, the transmitter can adjust the power, or keep the power. In adjusting the power, if the sum of cumulation factors increases, the transmitter decreases the control power by controlling the power, and if the sum of cumulation factors decreases, the transmitter increases the control power by controlling the power. In keeping the power, the transmitter keeps the power when a cumulated change is not great.

A description will now be made of power control and mobility estimation.

The transmitter determines whether the reference power plus the sum of cumulation factors is in the reference power region P_Reference_region. If the reference power plus the sum of cumulation factors is in the reference power region P_Reference_region, the transmitter keeps the reference power. The transmitter can adjust the power control, or keep the power control.

The maximum power, because it is the maximum possible power of the transmitter, can be associated with the routing issue. That is, the transmitter continuously tracks the distance between two transmitters by continuing the mobility estimation. In addition, if the reference power plus the sum of cumulation factors is in a long range boundary region long_range_region, the transmitter triggers a mobility routing protocol. Further, the mobility routing protocol can indicate a possible decrease in the route quality.

With reference to FIG. 1, a description will now be made of a power control method for simultaneously performing power control and mobility tracking of a transmitter.

FIG. 1 is a flowchart illustrating an example of a power control method for simultaneously performing power control and mobility tracking of a transmitter.

In step 100, the transmitter receives signals. The transmitter can be one of a Mesh Access Point (MAP), a Mesh Point (MP) and a Station (STA). In step 110, the transmitter calculates cumulation factors. The cumulation factors can be set in various ways. In step 120, the transmitter sets reference power. The reference power is set to a reference value for mobility tracking of the transmitter, and is determined depending on the scope to which the reference power plus the sum of all cumulation factors belongs. In step 130, the transmitter controls the power. The power control can also depend on the scope to which the reference power plus the sum of all cumulation factors belongs. In step 140, the transmitter tracks the mobility depending on the reference power. The mobility tracking is continuously performed even when the reference power is greater than the maximum power, and in this manner, it is possible to estimate relative positions of the transmitters. In step 150, the transmitter estimates a route. In the route estimation process, when the reference power is set to an upper boundary region, the transmitter can indicate a possible decrease in the route quality. In this manner, stability of the mesh network can be secured.

Figure 2:
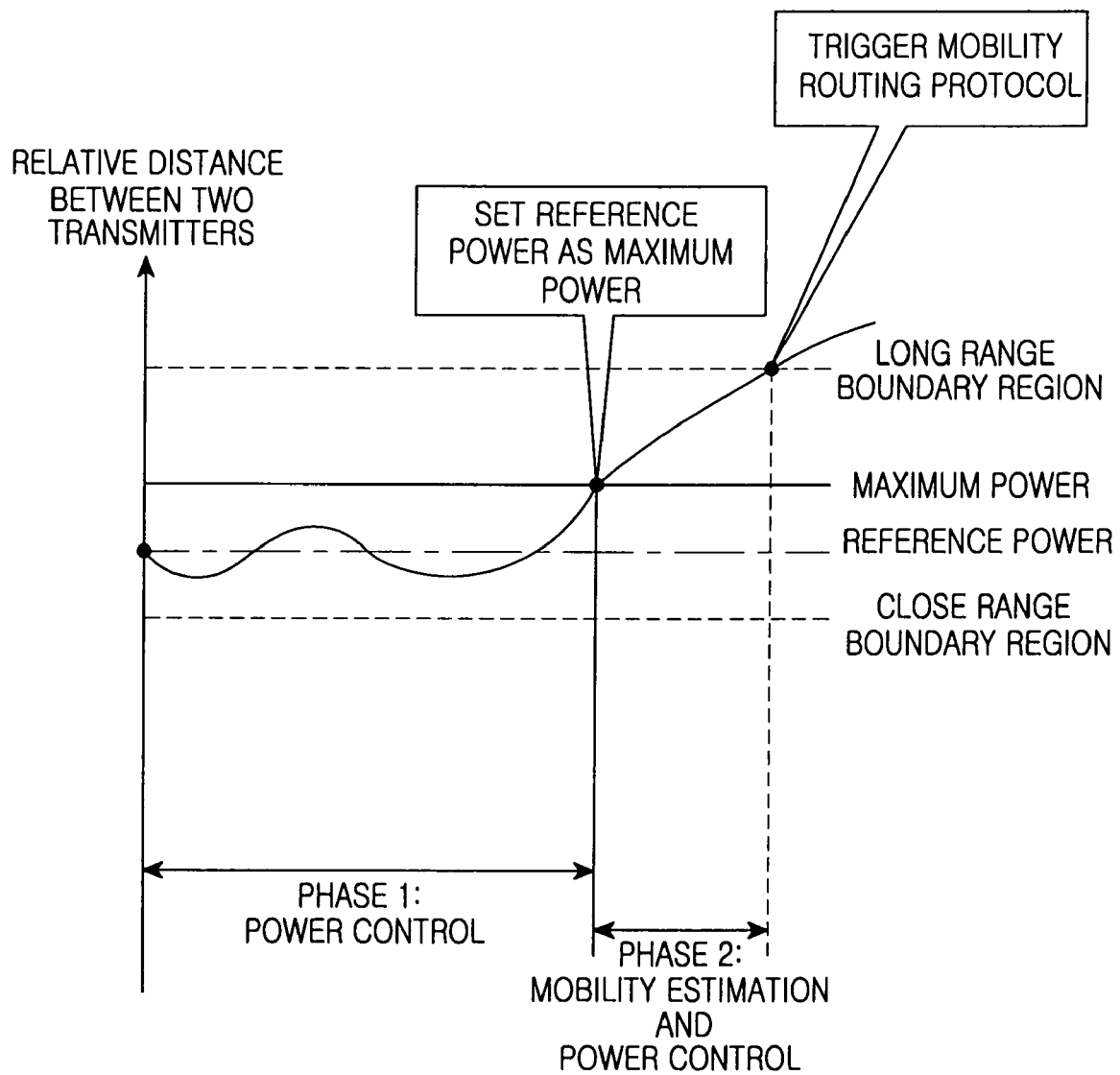
FIG. 2 is a diagram illustrating an example of a power control method for an increasing relative distance between two transmitters.

With reference to FIG. 2, a description will now be made of a power control method for simultaneously performing power control and mobility tracking of a transmitter.

FIG. 2 is a diagram illustrating an example of a power control method for an increasing relative distance between two transmitters.

Referring to FIG. 2, the example includes a first phase for power control and a second phase for mobility estimation and power control. In the first the phase, if the reference power P_Reference is less than the maximum power P_max, power is controlled. In the second phase, if the reference power P_Reference is greater than the maximum power P_max and is less than the long range boundary (P_long_range_region), power control and mobility tracking is performed.

More specifically, in the first phase, the transmitter compares a first power with a second power, and sets a cumulation factor depending thereon. Thereafter, the transmitter sets a reference power according to a scope to which a predetermined reference power plus a sum of all cumulation factors belongs, and controls the power according to the predetermined reference power plus the sum of all cumulation factors.

In the second phase, the transmitter estimates the mobility and controls the power according to the predetermined reference power plus the sum of all cumulation factors. In addition, if the reference power plus the sum of cumulation factors is greater than the long range boundary value, the transmitter triggers a mobility routing protocol. The mobility routing protocol has a function of indicating a possible decrease in the route quality.

The transmitter has reference values of long range boundary, maximum power, reference power, and close range boundary for power control according to a distance from the counterpart transmitter. Herein, the long range boundary indicates a boundary for triggering the mobility routing protocol, the maximum power indicates the maximum possible power of the transmitter, and the reference power indicates a reference value for mobility tracking.

Assume that a first reference power is set to a first control power. When a relative distance between two transmitters is in a reference power scope, the transmitter keeps the reference power. In addition, the transmitter controls transmission control power according to the relative distance, or sets it to the reference power. The reference power scope can be set herein as a scope between the long range boundary and the maximum power.

If the relative distance between two transmitters belongs to the maximum power scope, the transmitter sets the reference power as the maximum power, and then increases the transmission control power. If the relative distance between two transmitters further increases, the transmitter, because it cannot have a signal higher than the maximum power, continuously tracks the mobility while keeping the maximum power. If the distance between two transmitters is in the long range boundary region, the transmitter can trigger the mobility routing protocol and notify the decrease in the route quality to the counterpart transmitter and neighboring transmitters. Subsequently, the transmitter should find a new route. The poor-quality route can be excluded in the process of setting a new route.

Figure 3:
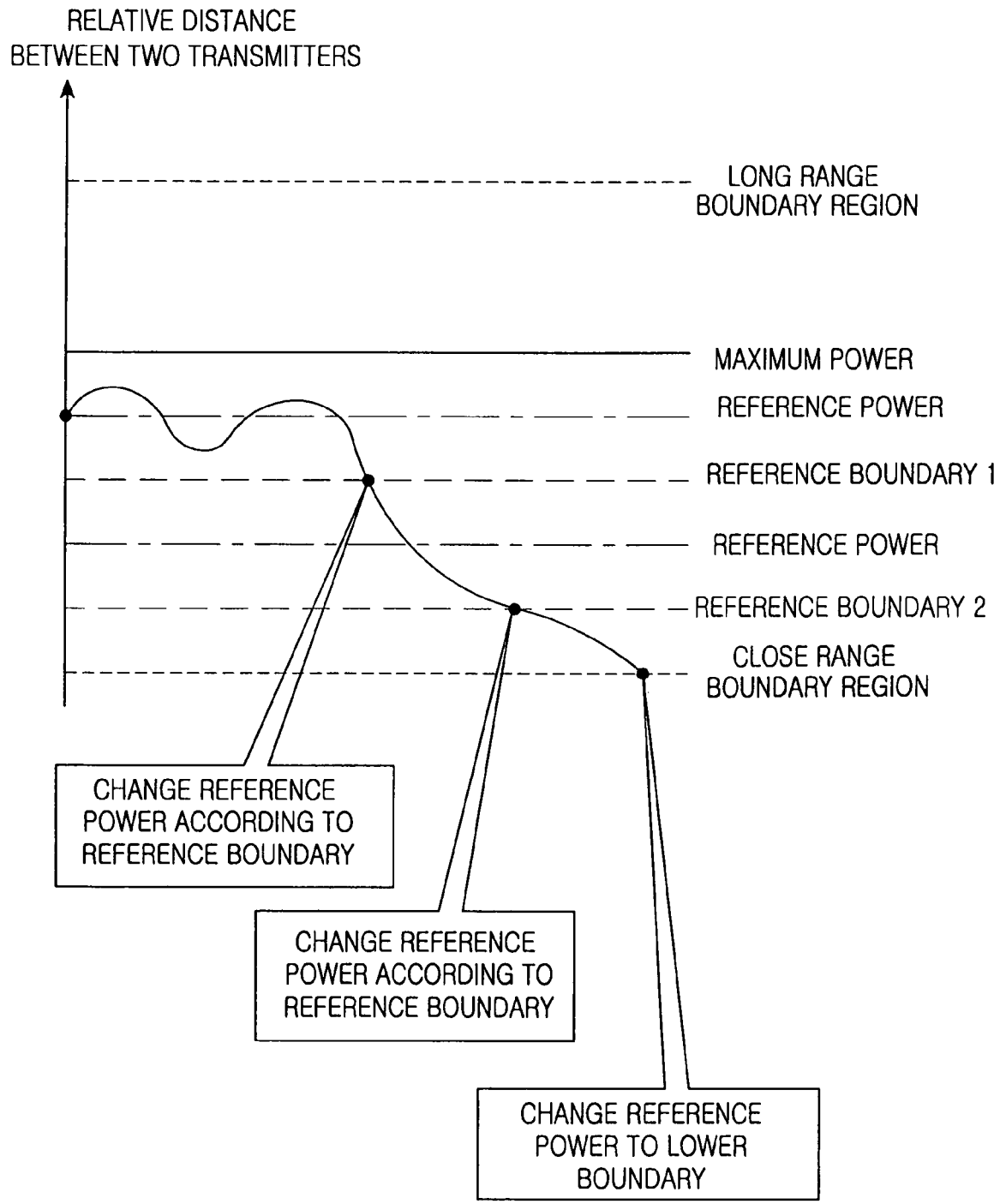
FIG. 3 is a diagram illustrating another example of a power control method for a decreasing relative distance between two transmitters.

With reference to FIG. 3, a description will now be made of a power control method for simultaneously performing power control and mobility tracking of a transmitter.

FIG. 3 is a diagram illustrating another example of a power control method for a decreasing relative distance between two transmitters.

Referring to FIG. 3, a transmitter has reference values of long range boundary, maximum power, reference power, reference boundary, and close range boundary for power control according to a distance from the counterpart transmitter. Compared to FIG. 2, FIG. 3 finely subdivides the reference power, so it can include more reference values for mobility tracking.

If the relative distance between two transmitters is in a region of each reference boundary, the transmitter selects a reference power corresponding to each reference boundary. FIG. 3 sets the reference power and reference boundary subdivided in several levels over the close range boundary of FIG. 2, thereby enabling fine power control and mobility tracking.

Figure 4:
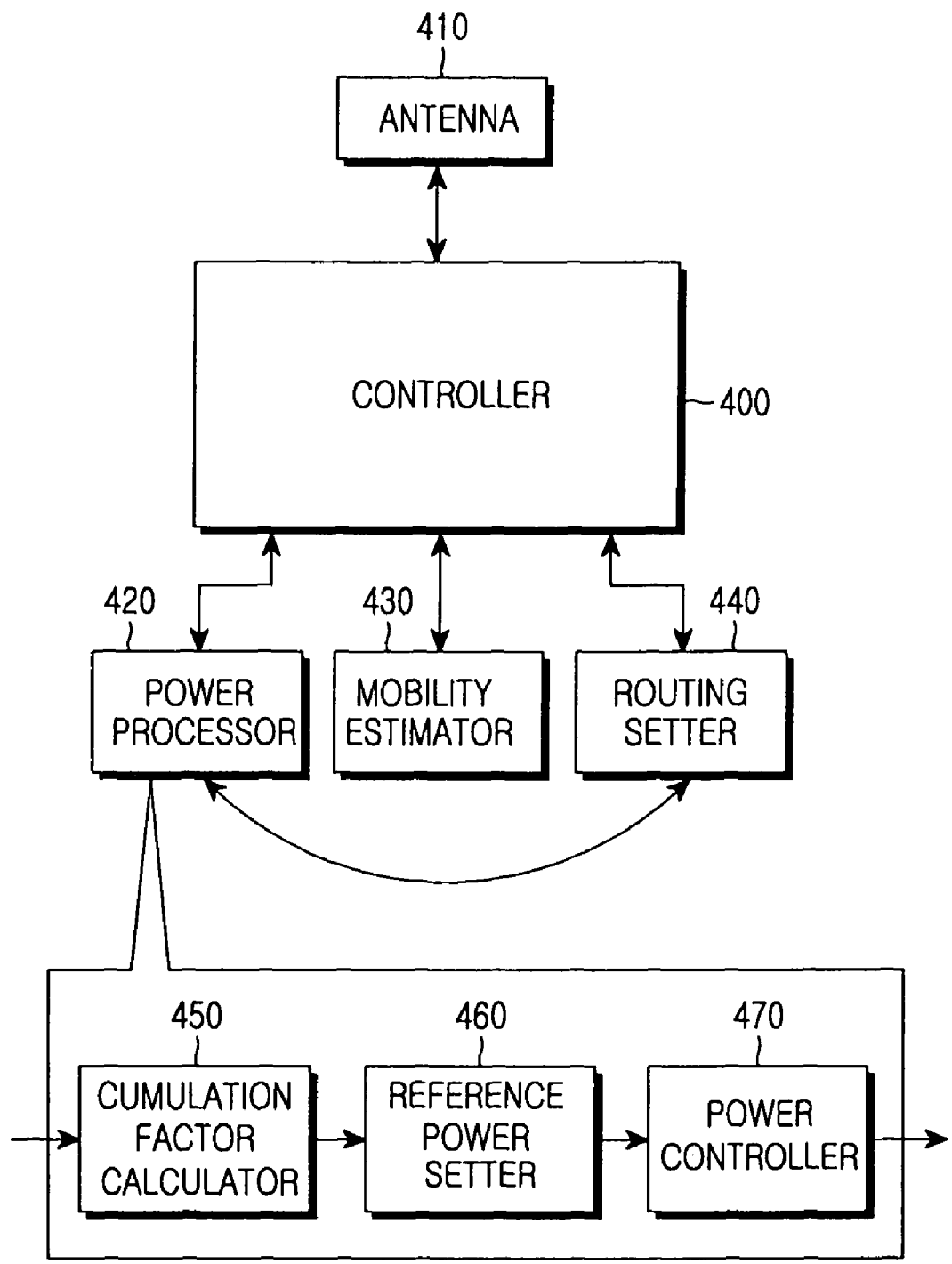
FIG. 4 is a block diagram illustrating an example of a structure of a power control Apparatus for simultaneously performing power control and mobility tracking of a transmitter.

With reference to FIG. 4, a description will now be made of a power control apparatus for simultaneously performing power control and mobility tracking of a transmitter.

FIG. 4 is a block diagram illustrating an example of a structure of a power control apparatus for simultaneously performing power control and mobility tracking of a transmitter For convenience, the blocks unassociated with the example are removed from FIG. 4.

The example of the power control apparatus includes a controller 400, an antenna 410, a power processor 420, a mobility estimator 430, and a routing setter 440. The power processor 420 includes a cumulation factor calculator 450, a reference power setter 460, and a power controller 470. In FIG. 4, bidirectional arrows indicate that the power processor 420, the mobility estimator 430 and the routing setter 440 can be repeatedly triggered (or enabled).

The antenna 410 receives a signal and outputs it to the controller 400. The cumulation factor calculator 450 receives from the controller 400 the factors necessary for cumulation calculation, and calculates the total cumulation factor value using the received factors. The reference power setter 460 sets a reference power according to the scope to which the reference power plus a sum of all cumulation factors belongs. The power controller 470 generates as many power signals as required, by controlling the power. The route setting 440 detects a route depending on the reference power plus the sum of cumulation factors.

Figure 5:
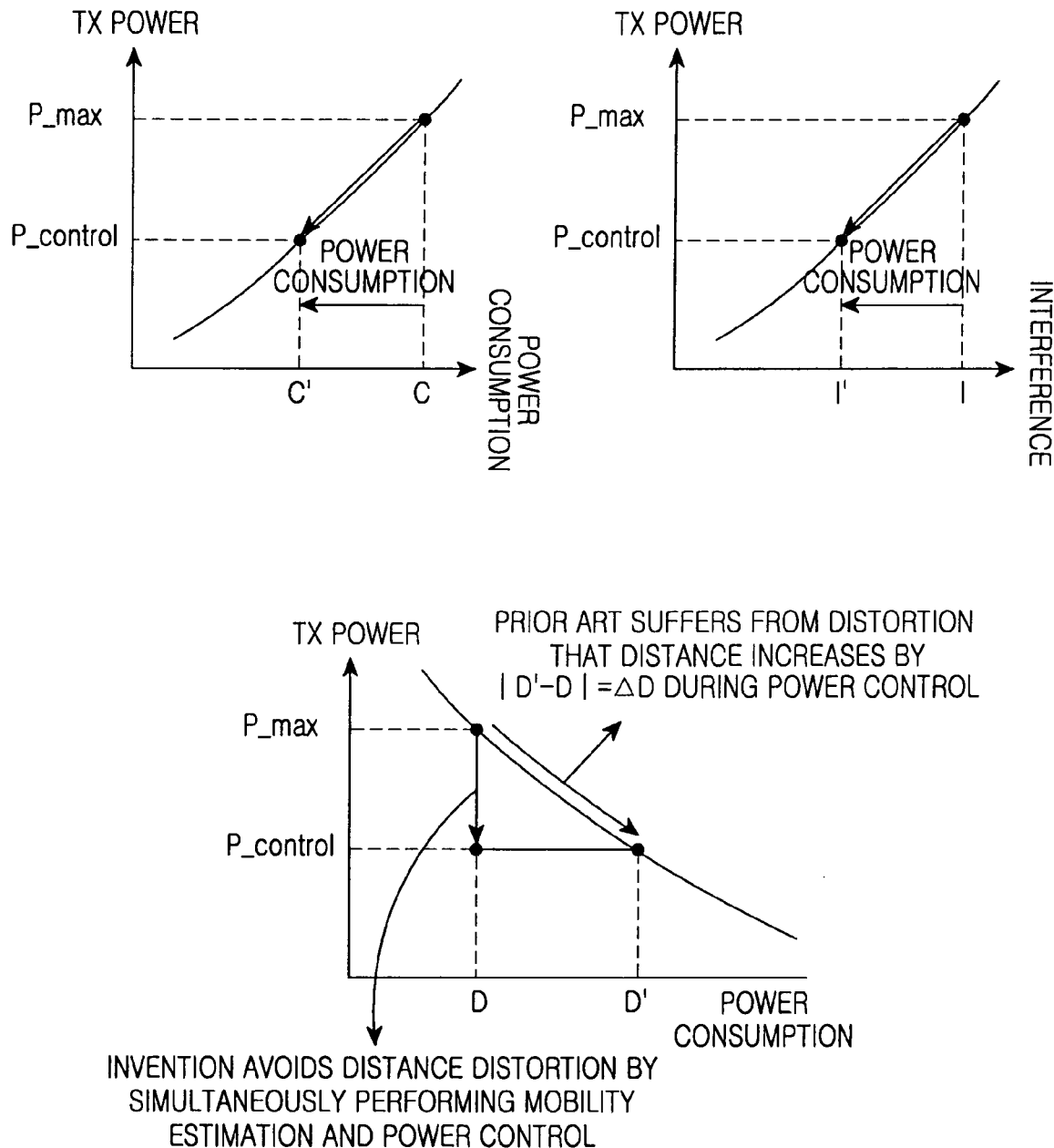
FIG. 5 is a diagram illustrating an example of an effect of power control and route tracking of a transmitter.

With reference to FIG. 5, a description will now be made of an example of an effect of power control and route estimation of a transmitter.

FIG. 5 is a diagram illustrating an example of an effect of power control and route tracking of a transmitter.

The top left graph of FIG. 5 shows the relationship between transmission power and power consumption. This graph is shown for the case where the power to be transmitted at the maximum power is reduced to the controlled power. As shown in the graph, power consumption may be reduced through the power control.

The top right graph of FIG. 5 shows the relationship between transmission power and interference of the transmitter. This graph is shown for the case where the power to be transmitted at the maximum power is set to the controlled power. As shown in the graph, interference between transmitters of the mesh network may be reduced through the power control.

The bottom graph of FIG. 5 shows the relationship between transmission power and distance. The conventional technology suffers from the distortion phenomenon that the distance increases during power control, because it separately performs power control and mobility tracking However, in examples described herein, mobility tracking and power control may be performed simultaneously, thereby avoiding the distance distortion and thus facilitating a better power control method through distance estimation.

As is apparent from the foregoing description of examples described herein, power consumption may be reduced by means of power control through distance measurement between transmitters, contributing to an increase in the life time of the wireless mesh network. Further, interference may be reduced and a stable route may be provided, contributing to an increase in the entire network performance.

In addition, according to examples described herein, the technique of simultaneously applying mobility estimation and power control may be provided, making it possible to perform mobility tracking with a cumulated change. The mobility tracking based on the change in cumulation facilitates efficient power control.

While a few examples have been shown and described it will be understood by those skilled in the art that various changes in form and details may be made therein without departing from the spirit and scope of the the appended claims.

What is claimed is:

1. A method for controlling power of a transmitter in a mesh network, the method comprising:
    calculating cumulation factors to estimate a distance between the transmitter and a different transmitter, the calculating of the cumulation factors comprising repeatedly comparing a first power with a second power, the first power being a currently measured transmission power, the second power being transmission power measured a predetermined time in advance of the first power;
    setting a reference power to one of a first measured transmission power and a maximum power; and
    controlling transmission power based on the estimated distance according to a scope to which a value obtained by adding a predetermined reference power to a sum of the calculated cumulation factors belongs.

2. The method of claim 1, wherein calculating of the cumulation factors further comprises:
    comparing the reference power with the first power; and
    comparing the first power with the second power.

3. The method of claim 1, further comprising:
    estimating mobility according to the reference power plus the sum of the calculated cumulation factors.

4. The method of claim 1, further comprising:
    triggering a mobility routing protocol when the reference power plus the sum of the calculated cumulation factors is greater than a long range boundary value.

5. The method of claim 1, wherein the cumulation factors are calculated for cases where the first power is one of less than the second power and greater than the second power, in a state where the reference power is greater than the first power, and calculated for cases where the first power is one of less than the second power and greater than the second power, in a state where the reference power is less than the first power.

6. The method of claim 1, wherein the cumulation factors are calculated as values obtained by subtracting the second power from the first power.

7. The method of claim 1, wherein the controlling comprises:
    reducing the transmission power and changing the reference power to a low control power, if the value obtained by adding the reference power to the sum of the calculated cumulation factors belongs to a close range boundary region.

8. The method of claim 7, wherein the close range boundary region is set in a region near a close range boundary to indicate a decrease in the reference power.

9. The method of claim 1, wherein the controlling comprises:
    adjusting or keeping the transmission power, if the value obtained by adding the reference power to the sum of the calculated cumulation factors belongs to a reference power region.

10. The method of claim 9, wherein the adjusting comprises:
    decreasing the transmission power in response to an increase in the sum of the cumulation factors, and increasing the transmission power in response to a decrease in the sum of the cumulation factors.

11. The method of claim 1, wherein the controlling comprises:
    setting the transmission power to a maximum power, if the value obtained by adding the reference power to the sum of the calculated cumulation factors belongs to a maximum power region.

12. The method of claim 1, further comprising:
    setting the reference power to a reference value that is determined according to the scope to which a value obtained by adding a predetermined reference power to the sum of the calculated cumulation factors belongs.

13. The method of claim 12, further comprising:
    estimating mobility according to the predetermined reference power plus the sum of the calculated cumulation factors.

14. An apparatus for controlling power of a transmitter in a mesh network, the apparatus comprising:
    a reference power setter configured to set a reference power to be one of a first measured transmission power and a maximum power;
    a controller configured to compare:
        a reference power with a first power, the first power being a currently measured transmission power; and
        the first power with a second power, the second power being a transmission power measured a predetermined time in advance of the first power;
    a cumulation factor calculator configured to estimate a distance between a transmitter and a different transmitter by calculating cumulation factors, the cumulation factors being calculated by repeatedly comparing the first power with the second power; and
    a power controller configured to control transmission power based on the estimated distance according to a scope to which a value obtained by adding the set reference power to a sum of the calculated cumulation factors belongs.

15. The apparatus of claim 14, further comprising a mobility estimator configured to estimate mobility of the transmitter according to the reference power plus the sum of the calculated cumulation factors.

16. The apparatus of claim 14, further comprising a routing setter configured to trigger a mobility routing protocol when the reference power plus the sum of the calculated cumulation factors is included in a long range boundary region.

17. The apparatus of claim 14, wherein the cumulation factor calculator is further configured to calculate the cumulation factors:
    for cases where the first power is one of less than the second power and greater than the second power, in a state where the reference power is greater than the first power; and
    for cases where the first power is one of less than the second power and greater than the second power, in a state where the reference power is less than the first power.

18. The apparatus of claim 14, wherein the cumulation factor calculator is further configured to cumulate the sum of the calculated cumulation factors as a negative unit value, if a sum of first power measurements is greater than a sum of second power measurements.

19. The apparatus of claim 14, wherein the cumulation factor calculator is further configured to cumulate the sum of the calculated cumulation factors as a positive unit value, if a sum of first power measurements is less than a sum of second power measurements.

20. The apparatus of claim 14, wherein the cumulation factors are calculated by subtracting the second power from the first power.

21. The apparatus of claim 14, wherein the power controller is further configured to reduce the transmission power and change the reference power to a low control power, if the value obtained by adding the reference power to the sum of the calculated cumulation factors belongs to a close range boundary region.

22. The apparatus of claim 21, wherein the close range boundary region is set in a region near a close range boundary to indicate a decrease in the reference power.

23. The apparatus of claim 14, wherein the power controller is further configured to adjust or keep the transmission power, if the value obtained by adding the reference power to the sum of the calculated cumulation factors belongs to a reference power region.

24. The apparatus of claim 23, wherein, to adjust the transmission power, the power controller is further configured to:
   decrease the transmission power in response to an increase in the sum of the cumulation factors; and
   increase the transmission power in response to a decrease in the sum of the cumulation factors.

25. The apparatus of claim 14, wherein the power controller is further configured to set the transmission power to the maximum power, if the value obtained by adding the reference power to the sum of the calculated cumulation factors belongs to a maximum power region.

* * * * *